United States Patent [19]

Lee

[11] 4,292,958
[45] Oct. 6, 1981

[54] SOLAR HEAT ABSORBER FOR SOLAR HEAT COLLECTORS

[75] Inventor: Marlow Lee, Clawson, Mich.

[73] Assignee: H & H Tube & Mfg. Co., Southfield, Mich.

[21] Appl. No.: 102,117

[22] Filed: Dec. 10, 1979

[51] Int. Cl.³ .............................................. F24J 3/02
[52] U.S. Cl. .................................. 126/448; 165/175
[58] Field of Search ............ 165/175, 173, 172, 170, 165/171; 126/448, 444, 445, 442

[56] References Cited

U.S. PATENT DOCUMENTS

| | | | |
|---|---|---|---|
| 1,801,710 | 4/1931 | Abbot | 126/444 |
| 2,063,988 | 12/1936 | Dick | 165/175 |
| 3,239,000 | 3/1966 | Meagher | 165/175 |
| 3,859,980 | 1/1975 | Crawford | 165/175 |
| 4,031,881 | 6/1977 | Thiel | 165/175 |
| 4,037,583 | 7/1977 | Bakum et al. | 126/442 |
| 4,048,980 | 9/1977 | Googin et al. | 126/442 |
| 4,062,351 | 12/1977 | Hastwell | 126/444 |
| 4,136,272 | 1/1979 | Rudd | 126/446 |
| 4,158,355 | 6/1979 | Spitzer | 126/444 |
| 4,222,373 | 9/1980 | Davis | 126/445 |

*Primary Examiner*—Daniel J. O'Connor
*Attorney, Agent, or Firm*—Hauke and Patalidis

[57] ABSTRACT

A solar heat absorber for solar heat collector panels, formed of a pair of tubular headers, defining respectively an inlet and outlet header, and a plurality of flat tubular members disposed substantially coplanar, parallel and mutually adjoining, and connected at each end to one of the headers. In use, the absorbers of the invention are disposed as heat collector units in appropriate areas exposed to sun rays, and a fluid to be heated is circulated from one header to the other, the heat being soaked by the tubular members exposed to the sun rays being transmitted to the circulating fluid which is progressively heated as it flows from one header to the other.

5 Claims, 11 Drawing Figures

SOLAR HEAT ABSORBER FOR SOLAR HEAT COLLECTORS

BACKGROUND OF THE INVENTION

The invention relates generally to heat exchangers and more particularly to solar heat absorber units for heating by solar heat energy a fluid circulated through the units.

Diverse structures have been proposed and used in the past for the purpose of heating a fluid, preferably a liquid fluid such as water, by way of exposure of the structure to sun rays while the liquid is circulated through the structure from an inlet manifold or header to an outlet manifold or header, the liquid being progressively heated in the course of its flow progression from one header to the other. Examples of prior art methods and apparatus are disclosed in U.S. Pat. Nos. 679,451, 1,250,260, 2,358,476, 2,553,302, 3,076,450, 3,077,190, 3,145,707, 3,190,816, 3,387,602, 3,239,000, 3,273,227, 3,980,071, and Australian Patent specifications Nos. 53,407 and 257,425.

Many inconveniences are present in prior art devices, which are due to many reasons, such as the type of materials used for making the solar heat absorber unit, the small volume of liquid flowing through the unit, the complication of many designs, the difficulty of manufacturing and the resultant high cost of production, to name a few. Solar energy absorbers most practical under the present state of the art, as far as relative simplicity of structure and relatively low cost, seem to belong generally to two types. The first type takes the form of a plurality of parallel, spaced apart metallic tubes interconnecting an inlet header to an outlet header, soldered or welded to a heat absorbing flat or corrugated panel made of thin metallic sheet or foil. The second type of solar energy absorber panels generally used today are based on a structure, as disclosed in U.S. Pat. No. 3,273,227, made of a pair of superimposed metallic sheets provided at their adjoining areas with a pattern of weld inhibiting material coating, welded together at the areas not provided with the welding inhibiting material, and subsequently inflated under pressure along the unwelded areas to form interconnecting tubular portions. Such structures have in common the disadvantage that the area of the absorber panel through which the liquid is caused to flow, or wetted area, is a relatively small portion of the total area of the panel, with the result that the efficiency, or BTU capability per area unit of such panels, is relatively poor.

SUMMARY OF THE INVENTION

The present invention provides a structure for solar energy absorber panels which results into an almost 100% wetted" area, which permits a high liquid flow rate through a plurality of elongated flat tubular members disposed across the panel from the inlet manifold or cold header to the outlet manifold or hot header supplying heated liquid fluid. The present invention accomplishes its objects and results by way of a relatively simple structure utilizing components readily available on the market, and therefore requiring no special method of manufacture, no expensive tooling or fixtures, and requiring only a very small assortment of diverse identical components. The diverse objects and advantages of the present invention will become apparent to those skilled in the art when the following description of some of the best modes contemplated for practicing the invention is read in conjunction with the accompanying drawing wherein like reference numerals refer to like or equivalent parts and in which:

DETAILED DESCRIPTION OF THE PREFERRED EMBODIMENTS

Figure 1:
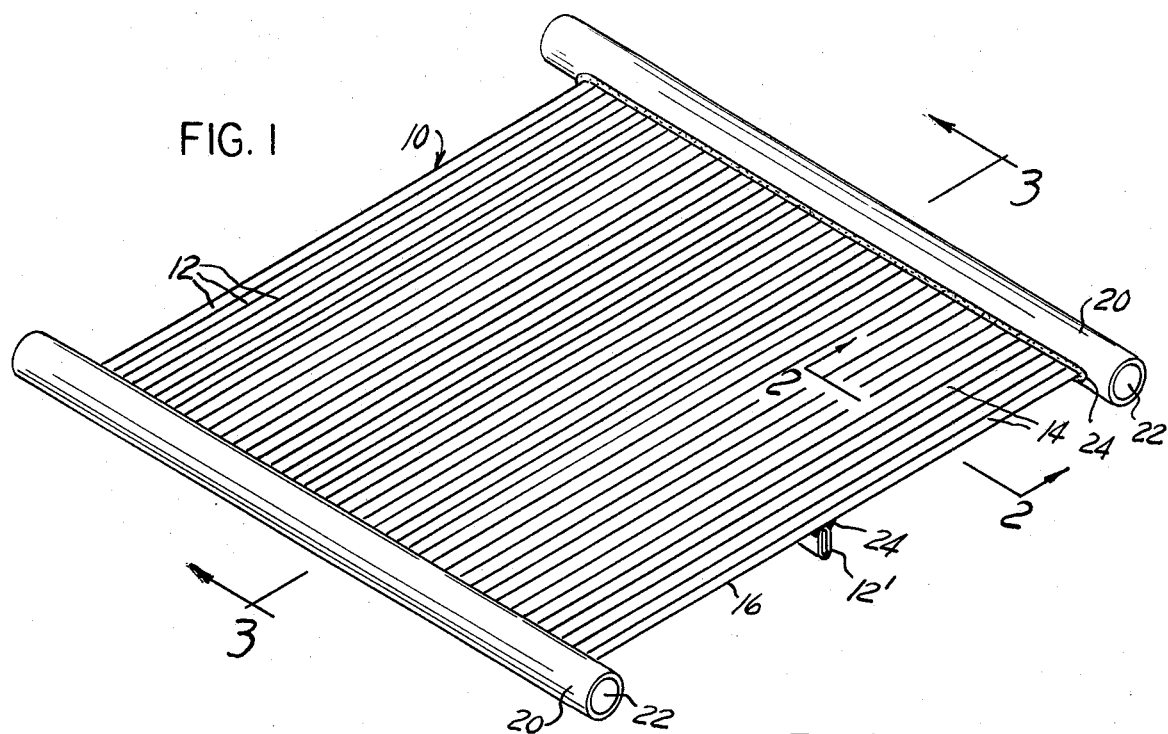
FIG. 1 is a schematic perspective view of a solar energy absorber panel according to the present invention.
Figure 2:
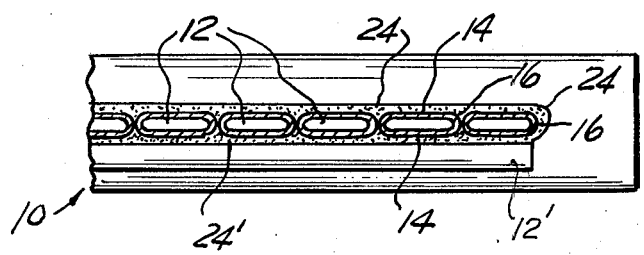
FIG. 2 is a partial transverse section along line 2—2 of FIG. 1.
Figure 3:
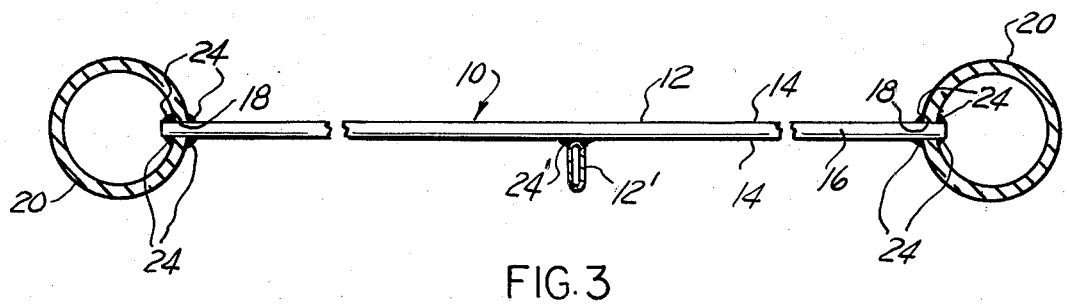
FIG. 3 is a longitudinal section as seen from line 3—3 of FIG. 1.
Figure 4:
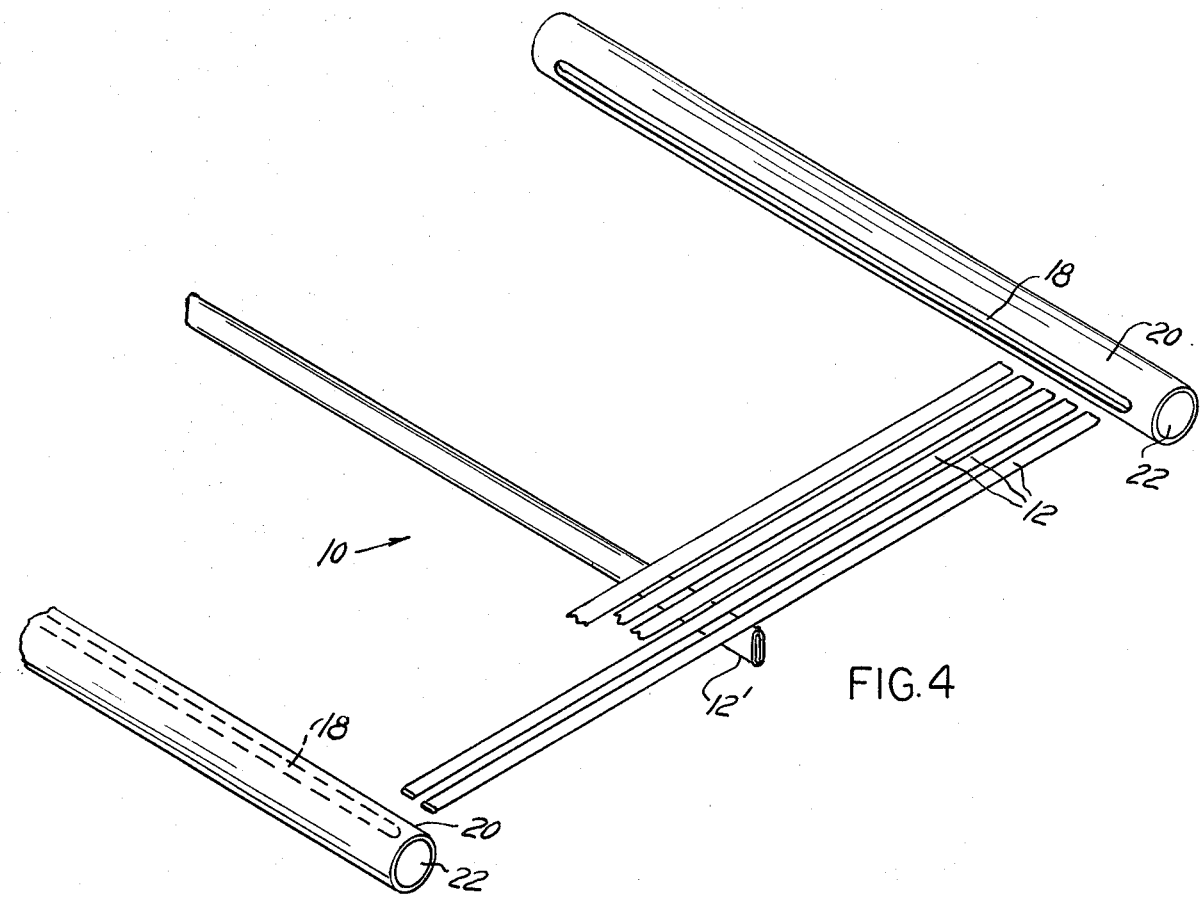
FIG. 4 is a schematic perspective exploded view of the structure of FIGS. 1-3.

Referring to the drawings, and more particularly to FIGS. 1-4, a solar energy absorber panel 10 for solar heat collector array comprises essentially a plurality of flat tubular members 12 disposed parallel to each other and adjoining one another. Each of the flat tubular members 12, as best shown at FIG. 2, has a pair of opposite, parallel, substantially flat, wide sidewalls 14 and a pair of opposite relatively narrow curvilinear sidewalls 16. The flat tubular members 12 are disposed side by side with each curvilinear sidewall 16 of a tubular member 12 adjoining and touching the corresponding curvilinear sidewall 16 of the adjacent tubular members. The flat tubular members 12 are disposed such that their wide sidewalls 14 disposed on each side of the panel 10 are substantially coplanar, so as to present a large area adapted to be impinged upon by the sun rays when a panel 10 is installed at an appropriate location to act as an absorber and collector of solar heat. The tubular members 12 are collectively fitted at each of their open ends through a slot 18, FIG. 3-4, formed longitudinally through the wall of a manifold or header 20 in the form of a metallic tube or pipe. Each header 20 is open at both ends as shown at 22. The flat tubular members are soldered to the outer surface and also preferably to the inner surface of the wall of the header 20, at the edge of the slot 18, where they project at their ends through the slot 18, as shown at 24 at FIGS. 1-3. One, or more, cross-member 12', preferably made of a length of the same flat tube as the tubular members 12, extends laterally on one side of the panel 10 and is soldered, as shown at 24', to the exterior surface of the sidewalls 14 of the tubular members 12, such as to increase the rigidity of the assembled panel 10.

The cylindrical tubular members forming the headers 20 are preferably lengths of readily available copper or stainless steel tubing, and the flat tubular members 12 are preferably made of equal lengths of copper or stainless steel seamless or seamed flat tubing, also readily available at relatively low cost in the market. Soldering of the ends of the flat tubular members 12 to the headers 20 may be effected manually, automatically or by dipping. If it is desired to enlarge the cross area of each tubular member 12 for the passage of liquid from one header 20 to the other, the tubular members 12 may be conveniently expanded by plugging the two open ends 22 of one header 20 and one open end 22 of the other header, and applying pressure through the header remaining open end, for example up to 130-150 psi, which results in expanding slightly the thin walled tubular members 12 and in testing under pressure the structural integrity of the assembly, including the soldering of the tubular members 12 into the headers 20.

The absorber panel 10 thus forms an integral unit made of a plurality of adjacent juxtaposed thin walled flat tubular members 12 interconnected at their ends by the headers 20 such as to present a large "wetted" area exposed to solar heat energy and amounting, for all practical purposes, to the sum of the areas of the wide flat sidewalls 14 and of a portion of the curvilinear sidewalls 16 of the tubular members 12. The exposed surface of the panel 10 is preferably provided with a dark heat-absorbing layer or coating.

Figure 5:
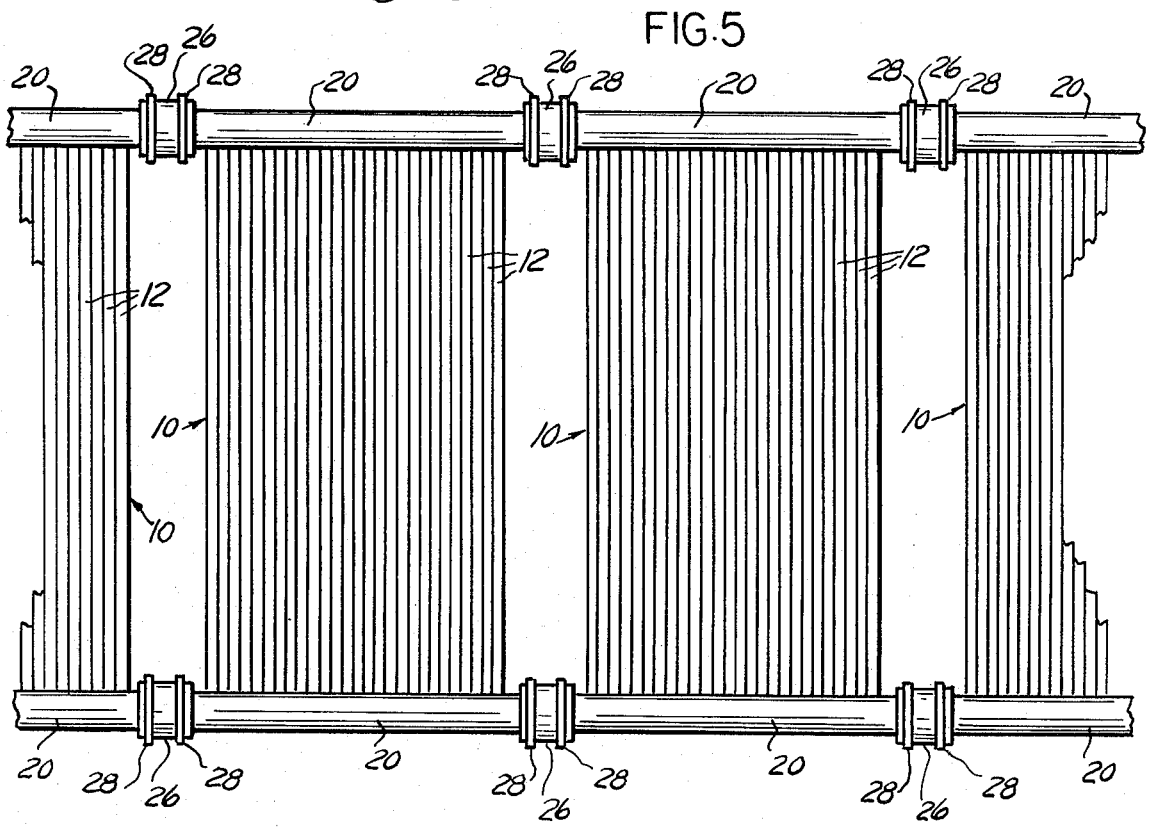
FIG. 5 is a schematic plan view showing a plurality of solar energy absorber panels according to the present invention interconnected in an array providing increased capacity.

The absorber panels 10 according to the present invention which are individually, for all practical purposes, full flow high efficiency heat collector and transfer units, may be interconnected, for a large liquid flow rate, in parallel as illustrated at FIG. 5. A collector array may thus be formed by disposing a plurality of absorber panels 10 side by side and interconnecting in series all the headers 20 at each end by means of flexible couplings 26 held in position by circular clamps 28. One of the resulting common headers, for example the lower common header as seen at FIG. 5, is connected to an inlet for cold water, for example, and the other common header, for example the upper line of headers 20 as seen in FIG. 5, is connected to a hot water utilization unit, such as a hot water heating system for a building, a heat exchanger disposed in a swimming pool or in the water circulation and filtration system of the swimming pool, to a hot water main supply for a building, or the like.

Figure 6:
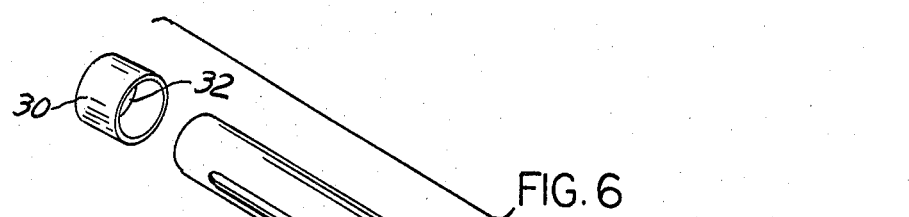
FIG. 6 is an example of a header assembly forming part of the solar energy absorber panel according to the present invention, shown in perspective exploded view.
Figure 8:
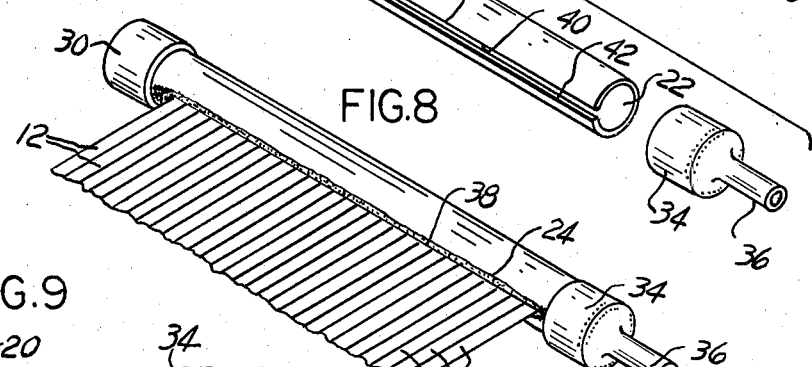
FIGS. 8 and 9 are respectively a partial perspective view and a plan view of an absorber panel provided with the header assemblies of either FIG. 6 or FIG. 7.
Figure 9:
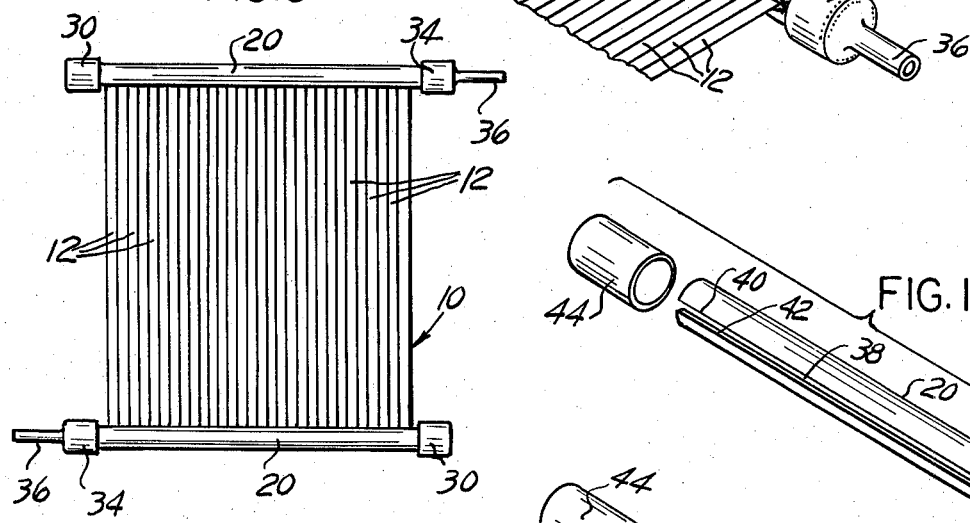

Single absorber collector units, such as illustrated at FIG. 9, are made by providing each slotted header 20, FIG. 6, with a plug 30 provided with a solid end wall 32 fitted over one open end 22, and with a connector 34 provided with a short length of pipe 36 fitted over the other open end 22, both soldered or brazed in position, as illustrated at FIG. 8, such that the complete assembly, FIG. 9, provides an absorber unit 10 having an inlet consisting of one of the pipes 36 connected through the corresponding header 20 to the opposite header outlet pipe 36 via the plurality of heat collecting flat tubular members 12. Several such absorber units 10, as shown at FIG. 9, can be connected to form a collector array, with the individual absorber units connected in series, in parallel, or in series-parallel according to the requirements for heated fluid.

Figure 7:
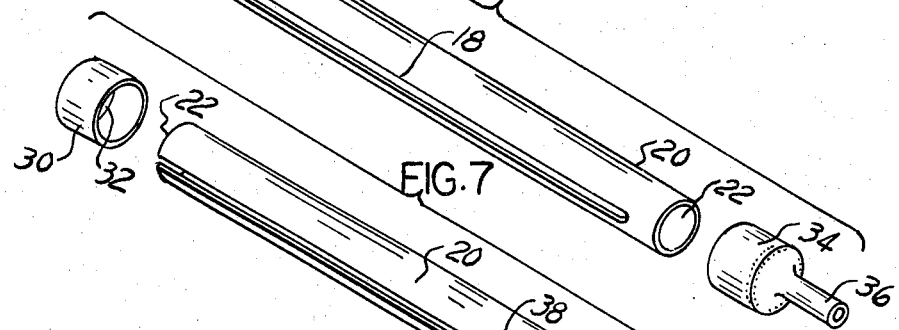
FIG. 7 is a view similar to FIG. 6 but showing another example of structure for a header assembly.
Figure 10:
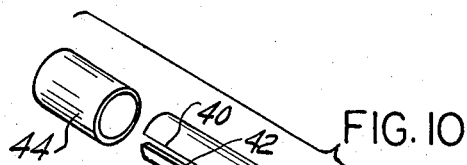
FIG. 10 is an exploded perspective view of another example of header assembly according to the present invention.

Instead of utilizing a length of pipe to form the headers 20, which require machining the slot 18 conventionally by a milling operation, the slot may be made so as to extend from one open end 22 to the other open end 22 of a length of pipe such as to form a continuous slot 38 as illustrated at FIGS. 7 and 10. The continuous slot 38 may be cut by a saw, such as a circular high speed steel or carbide saw, or, preferably, a length of tubing or pipe, from which the headers 20 are cut, may be made by means of the conventional pipe roll forming machinery used for making welded-seam pipes, after adjusting the operation of the pipe forming rolls such that instead of providing for longitudinally abutting rolled sidewalls at the lateral welded seam, the longitudinal edges 40 and 42 of the sidewall remain spaced apart, as illustrated. Once the ends of the tubular members 12 are introduced into the slot 38, the plug 30 is fastened over one open end 22 of the header 20 and the other open end 22 of the header is provided with the tubular fitting 34, and after the diverse elements have been soldered in position, there is no practical difference between the alternative structures, whether the slot 18 is machined through the wall of a length of pipe, FIG. 6, or whether the slot is a continuous slot 38, FIG. 7.

Figure 11:
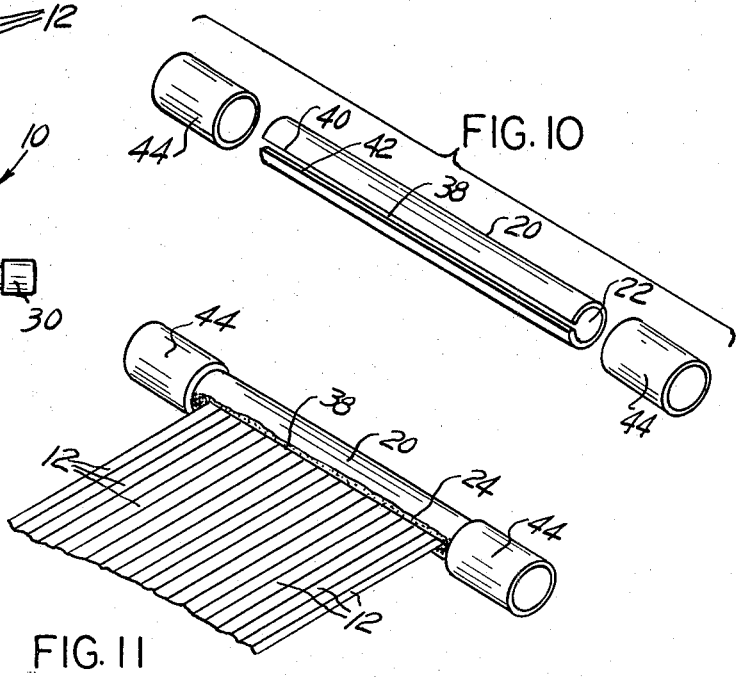
FIG. 11 is a partial perspective view of an absorber panel according to the present invention utilizing the header assembly of FIG. 10.

When the headers 20 are provided with the continuous slot 38 for soldered assembly therein of the ends of the flat tubular members 12, the ends of the slot 38 proximate the open ends 22 of the header may be closed by filling with solder or, alternatively and as shown at FIGS. 10–11, they may be provided with short lengths 44 of a larger diameter pipe soldered over the ends of the header. The resulting absorber panel unit is similar in structure and operation to the absorber units 10 of FIGS. 1–4, and is adapted for interconnection with other identical absorber units into an array as illustrated at FIG. 5.

It will be appreciated that brazing or welding may be used for assembling the absorber units of the invention, and that elements made of molded or extruded plastic resins may be substituted for all the elements forming the absorber units. However, it will be readily apparent that a metallic structure is preferable, especially for the heat collecting portion of the panels, namely the flat thin walled tubular members 12, and that substantial mismatch of the coefficients of expansion of the materials utilized for making the components should be avoided.

Having thus described the present invention by way of structural examples thereof, modifications whereof will be apparent to those skilled in the art, what is claimed as new is as follows:

1. A solar heat energy absorber panel comprising an inlet header and an outlet header, a slot extending through a lateral wall of each of said headers, a plurality of separate elongated tubular members placing said headers in fluid communication, each of said elongated tubular members being in the form of a substantially flat thin walled tube having a pair of relatively wide sidewalls disposed substantially parallel and integrally interconnected by a pair of opposite relatively narrow sidewalls, said tubes being disposed side by side with their relatively wide sidewalls coplanar and each of their relatively narrow sidewalls contiguous with the relatively narrow sidewall of an adjoining tube, at least one reinforcing cross-member extending laterally on one side of said panel and affixed to a relatively wide sidewall of each of said tubes and maintaining said relatively wide sidewalls on each side of said panel substantially co-planar, wherein said headers are each a length of pipe, said slot is formed radially through the wall of said length of pipe, said slot extends from one end to the other of said length of pipe, each end of each of said tubes is disposed transverse said slot in one of said headers and is affixed to the edge of said slot, and each end of each of said headers has a tubular member affixed thereover and covering the end of said slot wherein said reinforcing cross-member is a length of said substantially flat thin walled tube having its relatively narrow sidewall affixed to the relatively wide sidewall of each of said tubes.

2. The absorber panel of claim 1 wherein the relatively narrow sidewall of said tube is curvilinear in section.

3. The absorber panel of claim 1 wherein said tubular member at each end of each of said headers is a plug on one end and a connector fitting on the other.

4. The absorber panel of claim 1 wherein said tubular member at each end of each of said headers is a length of larger diameter pipe fitted at each end.

5. The absorber panel of claim 1 wherein each of said header is a length of sheet material roll-formed in a tubular shape with spaced apart edges defining said slot.

* * * * *